United States Patent [19]

Jackson

[11] 4,091,657
[45] May 30, 1978

[54] HEAT DETECTING APPARATUS AND METHOD

[75] Inventor: Jesse Milne Jackson, Greensboro, N.C.

[73] Assignee: Bell Telephone Laboratories, Incorporated, Murray Hill, N.J.

[21] Appl. No.: 752,069

[22] Filed: Dec. 20, 1976

[51] Int. Cl.² .............................................. G01M 3/28
[52] U.S. Cl. ....................................... 73/40; 73/40.5 R
[58] Field of Search ...................... 73/40.5 R, 40, 37; 340/229, 240

[56] References Cited

U.S. PATENT DOCUMENTS

| | | |
|---|---|---|
| 2,449,556 | 9/1948 | Kirkley .................................. 73/40 |
| 2,972,132 | 2/1961 | Putney ................................ 340/229 |
| 3,304,546 | 2/1967 | Kern et al. ......................... 73/40.5 R |
| 3,702,074 | 11/1972 | Mullen .............................. 73/40.5 R |

Primary Examiner—Anthony V. Ciarlante
Attorney, Agent, or Firm—Hugh L. Logan

[57] ABSTRACT

Apparatus and a method are disclosed for localizing excessive temperature occurring at any point along a path. In particular, a substantially constant pressure gas is applied via an orifice to a closed tubing which extends along the path. The tubing is selected to rupture at the predetermined excessive temperature. The approximate location of the rupture is determined by measuring the differential pressure across the orifice after a rupture occurs.

2 Claims, 1 Drawing Figure

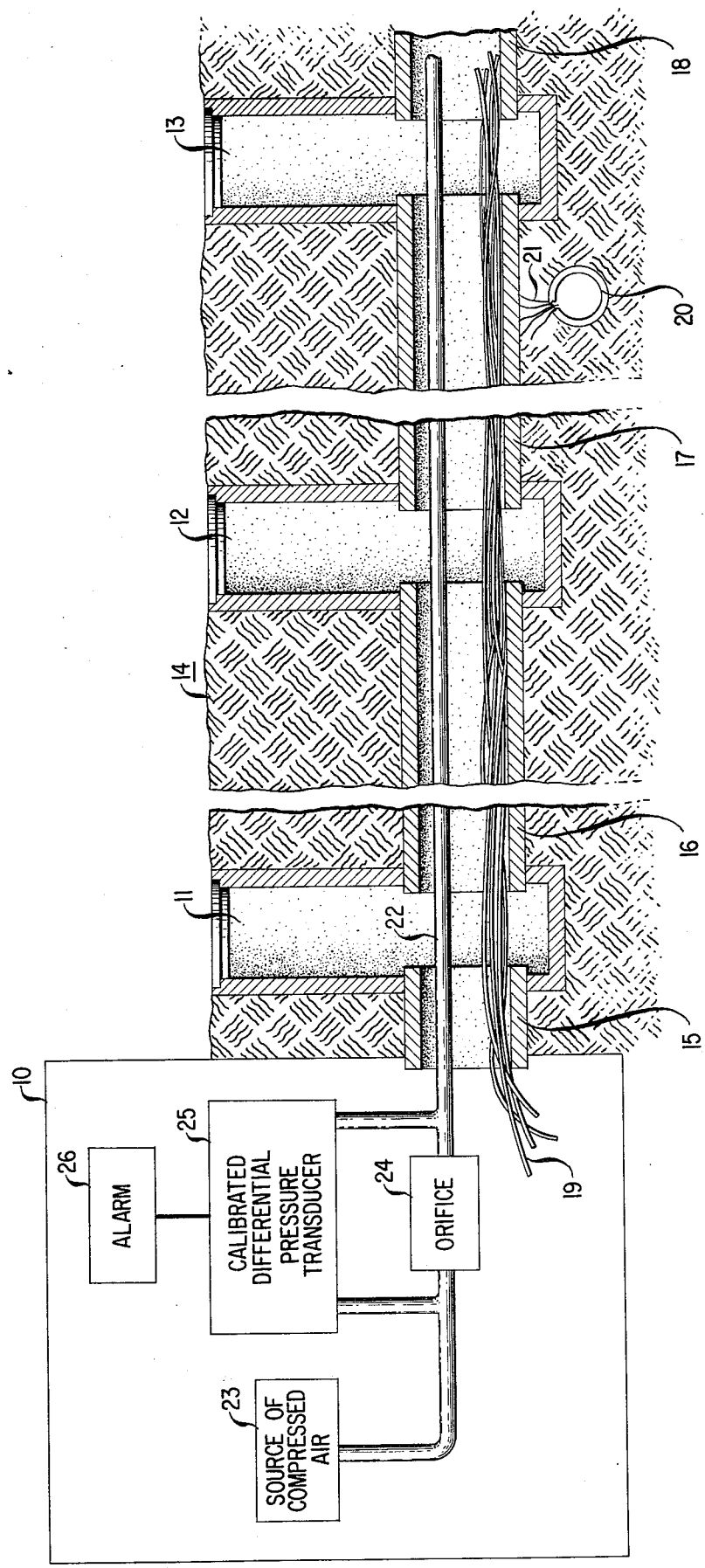

HEAT DETECTING APPARATUS AND METHOD

BACKGROUND OF THE INVENTION

1. Field of the Invention

This invention relates to the localization of excessive temperature conditions.

2. Description of the Prior Art

It is sometimes desirable — if not necessary — to indicate the occurrence of an excessive temperature along a continuous path such as through a building or through a conduit carrying telephone cables. U.S. Pat. No. 2,972,132, issued to C. B. Putney on Feb. 14, 1961, for example, discloses apparatus for producing such indications. The Putney apparatus comprises a continuous thermoplastic tubing strung along the path being supervised. The tubing is filled with a gas under pressure and connected to a switch responsive to a loss in the tubing pressure. The tubing and the pressure are selected so that the tubing ruptures when the temperature adjacent to the tubing reaches a predetermined excessive level. When a rupture occurs, the gas within the tubing is released and the pressure sensitive switch responds to give an alarm.

The above-mentioned Putney apparatus is adequate for indicating the occurrence of excessive temperature. However, it is inadequate when one also wishes to know the approximate location of the excessive temperature. In the case of telephone cables in conduits, for example, it is highly desirable to know the approximate location of any overheating. In particular, not only would time be saved in finding the problem but it is possible that corrective action can be instituted before the telephone cables are damaged to the extent that they must be replaced.

SUMMARY OF THE INVENTION

An object of the invention is to detect, in an inexpensive manner, the approximate location of excessive temperature along a path through a given environment.

This and other objects are achieved through the use — as in the prior art — of a pressurized tubing which coextends along a path of interest and ruptures in the presence of temperature in excess of a threshold value. Unlike the prior art, the present invention applies a substantially constant pressure gas to the tubing by way of an orifice and, furthermore, measures the differential pressure across the orifice. By measuring the pressure differential across the orifice after a rupture occurs, the approximate location of the rupture is determined.

In a preferred embodiment of the invention for telephone cable protection, air at a pressure of ten psi in excess of atmospheric pressure is applied via an orifice to one end of a plastic tubing whose other end is closed. The tubing may be formed of a copolymer material of the ethylene-vinyl acetate family. This material is selected to burst, under these pressure conditions, when the temperature adjacent to some part of the tubing is in the vicinity of 150° F. (The tubing does not burst as long as the temperature does not reach this level.) The differential pressure across the orifice, produced upon rupture, is measured by a transducer whose meter scale has been calibrated in feet. This calibration — which is discussed in detail with respect to the disclosed embodiment — is related to the differential pressure across the orifice, the pneumatic resistance of the orifice, the pneumatic resistance per unit length of the tubing, and the pressure of the source. For any one embodiment, the only variable is the differential pressure across the orifice.

Practice of the present invention offers several advantages. First, the tubing required is inexpensive and readily available on the commercial market. Secondly, when used in telephone applications, the tubing in the majority of cases will rupture before much — if any — damage is done to telephone cables. Thirdly, results produced by embodiments may be easily transmitted to central control or maintenance centers.

BRIEF DESCRIPTION OF THE DRAWING

The drawing shows a portion of a typical telephone cable system in which the invention is practiced.

DETAILED DESCRIPTION

A portion of a typical underground telephone cable system is shown in the drawing. The drawing shows a cable vault 10 and three manholes 11, 12 and 13. The vault is partially buried in the earth 14 while the manholes are completely buried so that their uppermost portions are substantially flush with the surface of earth 14. A conduit 15 passes underground between vault 10 and manhole 11. Similarly, conduits 16 and 17 pass between manholes 11 and 12 and manholes 12 and 13, respectively. A final conduit 18 leads away from manhole 13 to an unillustrated manhole. A group of jacketed telephone cables 19 pass from vault 10 through conduits 15 through 18.

A steam pipe 20 passes under conduit 17. Such pipes are common occurrences in the larger cities. Pipe 20 is shown as having developed a flaw so that steam 21 is leaking from the pipe and heating conduit 17. Whether or not this condition will damage cables 19 depends of course upon numerous factors including the location of the steam leak with respect to the conduit, the temperature of the leaking steam, the ability of other elements to dissipate the heat produced by the leaking steam, the construction of the telephone cables and the length of time the cables are exposed to the heat which exists within conduit 17.

A rapid localization of this excessive temperature condition would not only save time in localizing the problem but would also permit immediate action in an attempt to prevent damage to the cables. In particular, records could be prepared in advance to identify potential heat sources along the conduit path and suggestions as to actions to be taken when they cause overheating. Specific portions of these previously prepared records could then be referred to when an overheating condition has been localized. In the instant example, the records would indicate that steam pipe 20 is in the localized problem area. The records would further indicate what had to be done to halt passage of steam through the pipe. This information would permit fast action which could result in not having to replace the cables.

Fast localization of excessive heat in the conduits is achieved, in accordance with the invention, through the use of a thermoplastic tubing 22 which begins in vault 10 and passes through conduits 15, 16, 17 and 18. A source 23 applies, via an orifice 24, air under pressure to one end of tubing 22. The other end of tubing 22 (which of course is not visible in the drawing) is closed so that the air pressure in tubing 22 is normally equal to that produced by source 23. In a preferred embodiment, the pressure of the air from source 23 is 10 psi while the tubing is made of a copolymer material of the ethylenevinyl acetate family. Bursting of the tubing with such a configuration occurs at about 150° F.

A differential pressure transducer 25 is connected between input and output ports of orifice 24 to produce an output related to the differential pressure across the orifice.

The differential pressure across the orifice is $$\Delta P_o = F R_o \quad (1)$$

where $\Delta P_o$ = the orifice differential pressure, $F$ = the flow of gas through the orifice in cubic units per unit of time, and $R_o$ = the pneumatic resistance to flow through the orifice.

The flow of gas through the orifice is $$F = (\Delta P_o + \Delta P_t / R_o + R_t D) \quad (2)$$

where $\Delta P_t$ = the differential pressure in the tubing between the orifice and a rupture, $R_t$ = the pneumatic resistance of the tubing on a per unit length basis, and $D$ = the length of the tubing between the orifice and a rupture.

By substituting expression (2) in expression (1), the following expression for D is produced:

$$D = \frac{(\Delta P_o + \Delta P_t) R_o - \Delta P_o R_o}{\Delta P_o R_t} . \quad (3)$$

But $\Delta P_o + \Delta P_t = P_s$ where $P_s$ = the pressure of source 23 with respect to atmospheric pressure. Expression (3) therefore becomes $$D = \frac{P_s R_o}{\Delta P_o R_t} - \frac{R_o}{R_t} . \quad (4)$$

For any given embodiment, $P_s$, $R_o$ and $R_t$ are constants. Therefore, $$D = (C_1/\Delta P_o) - C_2 \quad (5)$$

where $C_1 = (R_o/R_t) P_s$ and
$C_2 = R_o/R_t$.

From expression (5), it is apparent that the distance D of the rupture from the orifice is inversely related to the differential pressure across the orifice. Differential pressure transducer 25 may therefore be calibrated in feet as well as in pressure. In fact, such a calibration is good for any installation where the same source pressure and the same types of tubing and orifice are used.

In further accordance with the invention an alarm 26 is connected to transducer 25 so that an alerting indication is produced whenever a differential pressure occurs across orifice 24. This indication is produced notwithstanding a relatively low drop in pressure at the output port of orifice 24 because of a rupture occurring at a relatively large distance from the orifice.

In the described embodiment the pressure within the tubing is 10 psi while the tubing material is a copolymer material of the ethylene-vinyl acetate family and has a wall thickness so that the tubing bursts when subjected to temperatures of about 150° F. Various other combinations of pressure, material and wall thickness may of course be selected for bursting at about 150° F.

The invention is not limited to embodiments which rupture at about 150° F. In particular, various combinations of tubing materials, wall thicknesses and pressures within the tubing may be chosen for rupturing at temperatures other than 150° F.

What is claimed is:

1. In a temperature monitoring system comprising a thermoplastic tubing for extension into an environment to be monitored and for containing a gas under pressure, said tubing and said pressure being selected so that said tubing ruptures when at least a portion thereof is exposed to a temperature in excess of a predetermined level, wherein the improvement comprises
    a source of compressed gas,
    an orifice means having input and output ports,
    means for connecting said source to said tubing via said orifice means, and
    a differential pressure transducer connected between said orifice means input and output ports for producing an output related to the differential pressure between said ports, in which said output is calibrated to indicate the location of the rupture with respect to said orifice means.

2. Apparatus to identify the approximate location of excessive temperature along an extended path through an environment, said apparatus comprising
    a source of pressurized gas,
    an orifice means having input and output ports with said input port connected to said source,
    a thermoplastic tubing for extension along said path, said tubing being constructed and connected to said orifice output port so that under normal conditions the interior of said tubing has a pressure equal to that of said pressurized gas and, furthermore, the material for said tubing and the pressure for said gas being selected so that said tubing ruptures when at least a portion thereof is exposed to said excessive temperature, and
    a differential pressure transducer connected between said orifice means input and output ports for producing an output related to the differential pressure between said ports in which said output is calibrated to indicate the location of the rupture with respect to said orifice means.

* * * * *